J. J. Curnan,
Tenoning Mach.
No. 105,432.    Patented July 19, 1870.

Witnesses.    Inventor.
Wm W Sansom    John J Curnan
J Morgan Wilcox

United States Patent Office.

JOHN J. CURNAN, OF LYONS, IOWA.

Letters Patent No. 105,432, dated July 19, 1870.

IMPROVEMENT IN TENONING-MACHINE.

The Schedule referred to in these Letters Patent and making part of the same.

I, JOHN J. CURNAN, of Lyons, county of Clinton, State of Iowa, have invented a new and useful Improvement in Tenoning-Machines, of which the following is a description.

Nature of my Invention.

My invention relates to the removing the upper arbor and coping-tool from a tenoning-machine, and putting an arbor or shaft with a saw-set on it at an angle to cut a "slot" in the ends of sash-rails, or any piece that has a double tenon, the machine cutting the shoulders, tenons, and "slot" all at the same time, thereby saving time in handling the material.

Description of the Accompanying Drawing.

General Description.

Same letters refer to same parts in the different figures.

A is the arbor or shaft.

B B, collars fitted to shaft A, and fastened with a set-screw.

C is the pulley.

D D are the boxes.

E, the saw, set on an angle, one side being an obtuse angle, the opposite side an acute angle to the line of the shaft or arbor.

H H, bevel collars to hold the saw in position.

K, frame or head, to hold arbor, and is fastened by bolts through apertures m m to frame of machine.

F, a nut, to hold collars in place.

L, an adjusting-screw to regulate the depth of cut.

N, space for a post to pass through for L to work against.

O, a "slot" cut by saw E in a meeting-rail.

P, meeting-rail, with two shoulders and " slot.

Figure 1:
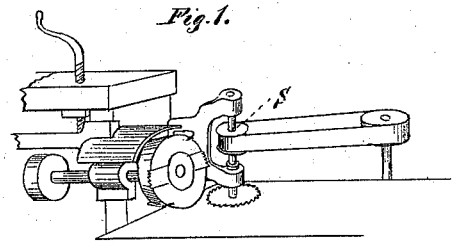
Figure 1 is a perspective view of the machine in the usual form, without my improvement.

S, fig. 1, place where the device is to be attached to the machine.

Operation.

Construct the arbor A so that it will fit the head that holds the coping-cutter at S, fig. 1. On the lower end of this shaft or arbor fit a bevel collar, that will give the saw E an inclination that, in rotating, will cut a groove or " slot " the requisite width.

Figure 3:
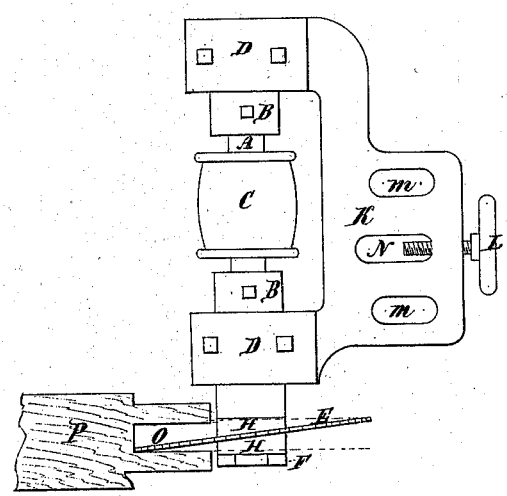
Figure 3 is a front view or elevation of the device.
Figure 2:
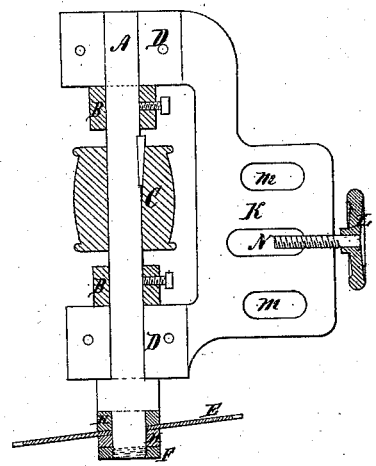
Figure 2 is a vertical section through the arbor and saw.

Remove the coping-arbor and put the one with the saw on in its place, and adjust it to the required place to cut the groove or "slot," as at O, fig. 3. Give the saw motion from the same pulley that gave the coping-tool motion.

Now, by putting in a rail that requires a groove or "slot," or double tenons, the horizontal cutters will cut the shoulders on top and under sides, while at the same time the saw will, by its inclination to the line of its shaft giving it a wabbling motion, cut the necessary groove or "slot," without any extra handling of material, thereby saving much time.

Claim.

The arbor A, fitted with a driving-pulley, D, and carrying an inclined or drunken saw at one end thereof, in combination with the detachable head or frame K, and with a set-screw, L, for adjustment, all the parts being constructed substantially as and for the purpose herein set forth.

JOHN J. CURNAN.

Witnesses:
WM. W. SANBORN,
J. MORGAN WILLCOX.